April 4, 1950 J. MANTELET 2,502,867
KITCHEN GRATER WITH GRATING DRUM
Filed Sept. 10, 1946 3 Sheets-Sheet 1
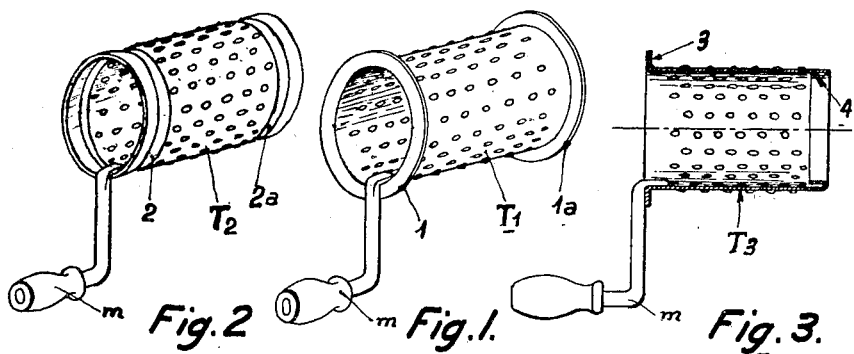
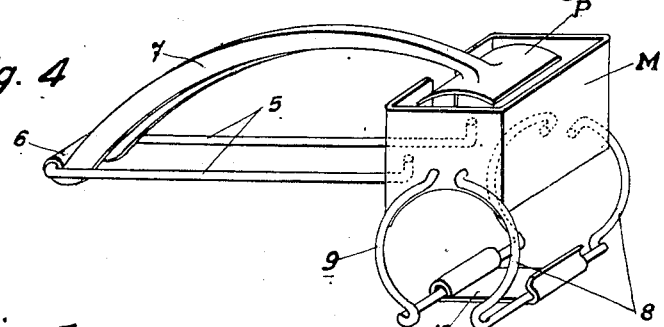
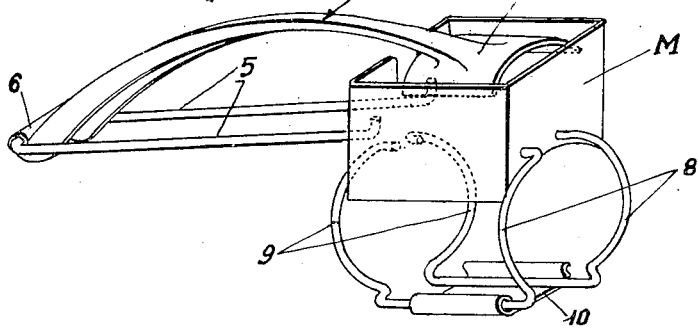
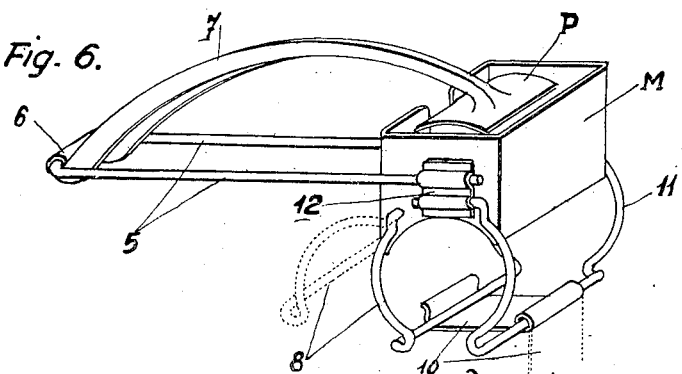

April 4, 1950 J. MANTELET 2,502,867
KITCHEN GRATER WITH GRATING DRUM
Filed Sept. 10, 1946 3 Sheets-Sheet 2

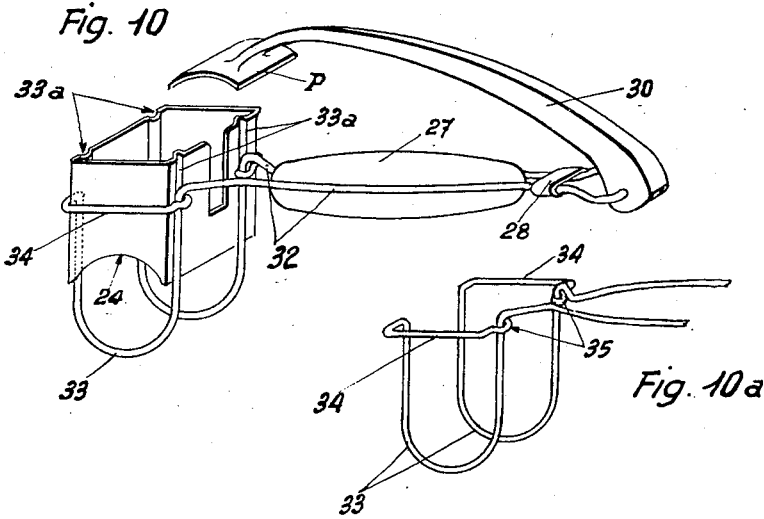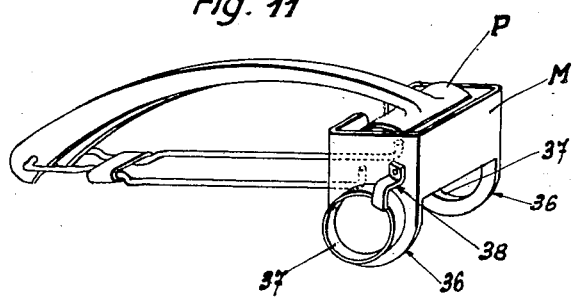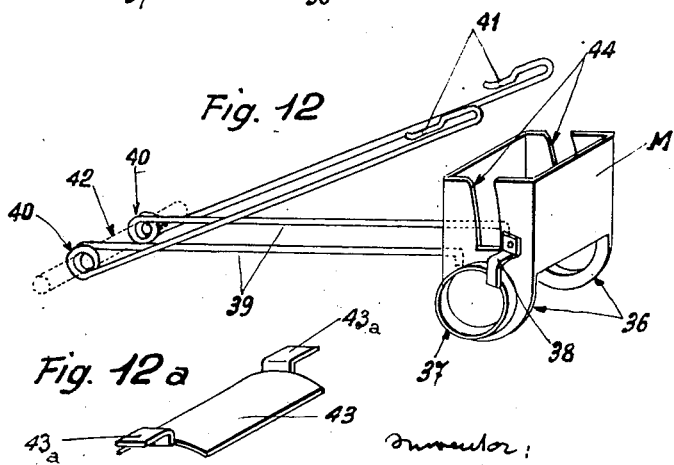

UNITED STATES PATENT OFFICE 2,502,867

KITCHEN GRATER WITH GRATING DRUM

Jean Mantelet, Bagnolet, France, assignor, by mesne assignments, to Le Moulin-Legumes Corporation, Wilmington, Del., a corporation of Delaware Application September 10, 1946, Serial No. 695,841
In Morocco September 13, 1945

7 Claims. (Cl. 146—92)

The present invention has for its object a kitchen grater with grating drum comprising, in a known manner, a hopper or receptacle adapted to contain the material to be grated and integrally connected with a handle, a grating drum rotatably carried by said hopper so as to close the outlet thereof and integrally connected with a crank permitting of rotating same around its axis and a pusher device hingedly connected with the handle and penetrating into said hopper so as to press the material to be grated contained in the hopper against the grating drum.

The present grater is made of light weight materials such as thin sheet metal and wire, whereby the cost price thereof may be reduced, and it is further remarkable in that it is easy to be handled and readily dismountable.

Said grater is characterized in that the grating drum, which is free from any central axle and is integrally connected through the medium of its inner wall with a crank extending from a generatrix of said wall, is rotatably mounted in a cradle supported by the hopper.

The invention is further characterized in that the drum is provided near each end thereof with stop means for preventing said drum from falling out of said cradle.

In accordance with a preferred embodiment of my invention, the cradle consists of two wire structures so shaped as to constitute at each end a curved or segmental bearing portion adapted to engage with the periphery of the drum and to abut against the corresponding stop means (flange or groove), at least one of said structures being pivotally mounted on said hopper so as to permit of its being moved from the other structure in view of dismounting the drum, said structures being locked together by connecting means while the grater is being used.

Figure 7:
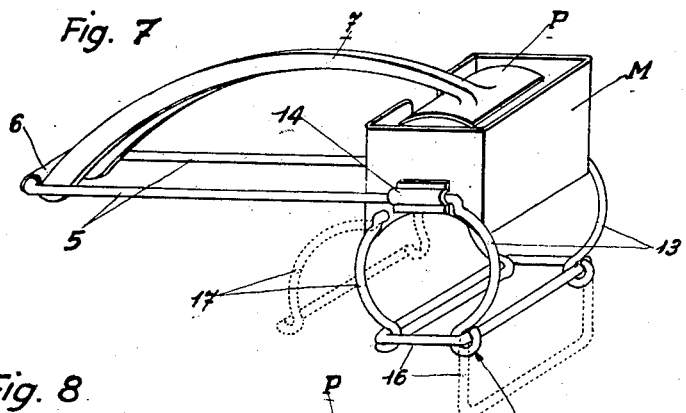
Figure 8:
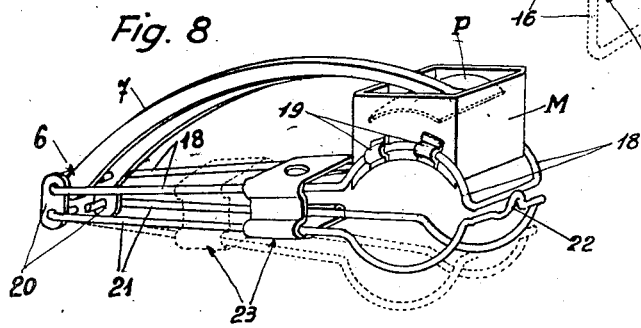
Figure 9:
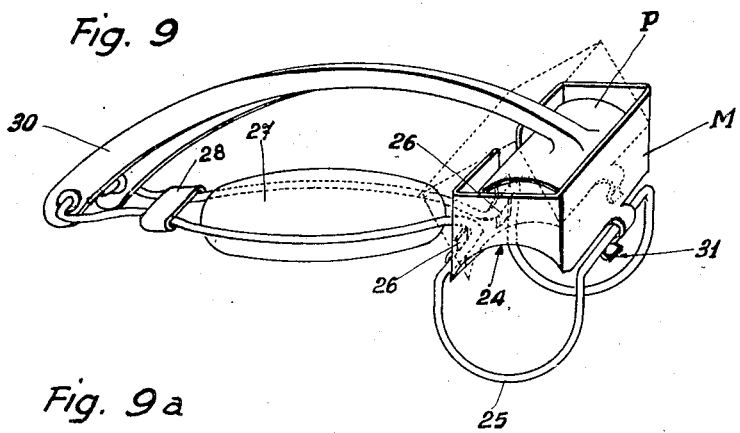
Figure 9A:
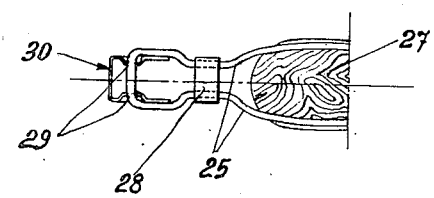

A few embodiments of my invention are shown as examples on the accompanying drawings on which:

Figs. 1 and 2 are perspective views showing two grating drums in accordance with the invention, Fig. 3 is a cross section of a third form of drum, Figs. 4 and 5 are perspective views of two embodiments of the kitchen grater in which the two drum carrying half-cradles are pivotally mounted on the hopper, the drum being removed, Fig. 6 is a similar view of a modification in which one the half-cradle is fixed, the other one being pivotally mounted, Fig. 7 shows another embodiment in which the fixed half-cradle is extended so as to form the handle, Fig. 8 shows another modification in which both half-cradles are extended so as to form a handle consisting of two hinged members coupled together by a sliding lock, Fig. 9 shows an embodiment in which a wire half-cradle, extended so as to form a handle, is pivotally mounted on the hopper, the side walls of which are cut out in a circle at the bottom so as to form the conjugated half-cradle, Fig. 9a is a detail sectional view showing the guiding means provided for the pusher lever, Fig. 10 is a perspective view of a grater in which the hopper is slidably mounted by means of slides on the wire structure constituting both the half-cradle and the handle, Fig. 10a is a fragmentary detail view of the structure, the hopper being removed, Fig. 11 shows a grater whose drum, similar to that of Fig. 3, is carried by two fixed bearings provided in side extensions of the hopper, Fig. 12 is a perspective view of an embodiment using a similar drum to that of Fig. 3 and whose handle and pusher lever consist of two spring wires which are coiled, safety pin-like, and suitably braced, the pusher plate being removed, Fig. 12a is a perspective view showing the pusher plate used with the grater of Fig. 12.

In Figs. 1 to 3 are shown three different types of drums $T_1$, $T_2$, $T_3$ adapted to be used with the grater of this invention; said drums are made of thin metal sheet provided with the usual rasping perforations and are free from hubs and central axle. In each type of drum the crank $m$ is a separate part arranged as a projecting extension from a generatrix of the drum and fastened to the inner wall thereof by any suitable means, for instance by electric welding.

In Fig. 1 the sheet metal drum shell comprises at each end a turned up flange $1$, $1a$ which, as shown in Fig. 1, is bent at right angle to the drum axis, though this particular shape of the flanges is not to be considered as limitative. In Fig. 2, the drum is provided near each end with a groove $2$, $2a$, preferably having in cross section the shape of a half-circle, the plane of symmetry of which is perpendicular to the drum axis. In Fig. 3 the shell is provided with a turned up edge at one end, forming an outer flange $3$, the opposite end portion being inwardly folded back upon itself, at $4$, for strengthening purposes.

Instead of the cylindrical form shown for each of these types of drums, other forms may be used without departing from the invention. Such other forms as may be mentioned, though these are not limitative, are, for instance, frustums, double frustums either connected together by their small bases or their large bases, barrel-like bodies of revolution with convex or concave walls. The drums may further be provided with projections, such as circular ribs or beads, suitably spaced or spirally coiled around the drums.

In Figs. 4 to 10 are shown graters from which the drums, which may be either of the type of Fig. 1 or the type of Fig. 2, have been removed, while Figs. 11 and 12 are similar views showing graters adapted to be used with a one-flange type of drum such as the type shown in Fig. 3.

The graters shown in Figs. 4 and 5 comprise a hopper or receptacle M, one wall of which has secured thereto, for instance by electrical welding, the perpendicularly turned up ends of a wire 5 bent into a U-shape comprising the three sides of a rectangle or a trapezium. The rolled end 6 of the lever 7 carrying the pusher plate P is pivotally mounted on the small side, which has substantially the same length in view of centering said pusher.

The drum is carried by a wire cage consisting of two structures 8, 9 whose perpendicularly bent ends are pivoted in openings provided in the opposite walls of the hopper. A hook 10 pivotally mounted on the center portion of the structure 9 yieldingly engages with the corresponding bearing portion of the structure 8. The half-circle bearing portions of both structures are either in engagement with the periphery of the drum and in abutment against the flanges 1, 1a (Fig. 1), or in engagement with the grooves 2, 2a, which prevent any sliding of the drum in the axial direction.

In Fig. 4, the plane of symmetry of the handle is perpendicular to the drum axis, while in Fig. 5 the latter is contained in said plane. The pusher plates will obviously have different shapes in these two arrangements so as to conform to the periphery of the drum.

In Fig. 6, the jaw 8 of the drum carrying cage is pivotally connected to the hopper, as in Fig. 4, whereas a fixed jaw 11, similar to the jaw 9 and likewise provided with a swinging hook 10, has both ends inserted in sockets provided, for example, in plate brackets 12 fastened to the hopper, said brackets receiving likewise the ends of the handle 5.

In the grater shown in Fig. 7, both ends of the handle 5 are inserted in sockets provided, for example, in brackets 14 fastened to the hopper, said ends being then curved so as to form a half-circle bearing portion 13 and finally rolled, at 15, for supporting a rectangular ring 16 adapted to lock a jaw 17 pivotally mounted on the hopper as in the case of the jaw 8.

In Fig. 8, the cage consists of a fixed jaw and a movable jaw integral with the handle. The fixed jaw is made of a wire 18, which is curved as shown and fastened to the hopper as by means of brackets 19 fastened to said hopper, both ends of said wire being bent at right angle and inserted into the rolled end portion 6, so that said portion may be pivotally supported thereby, and also through holes provided in two side plates 20, in view of locating the pusher plate.

The movable jaw is made of a wire 21 curved as the previous one, from which it only differs in that it comprises a center stop 22. Its two rectangularly bent ends are similarly inserted in holes provided in the plates 20. A sliding lock 23 is adapted to be shifted either to the position shown in full lines, in which it confines the drum, or to the position shown in dotted lines, in which it permits dismounting thereof.

In the embodiment shown in Figs. 9 and 9a, the drum is held between the semi-circular edges 24 of the hopper and similarly shaped bearing portions of a wire structure 25, curved as shown. This structure is pivotally mounted in bearings consisting of lugs 26 integrally connected with the hopper; and it encircles a handle member 27 with the aid of a lock 28. The two rectangularly bent ends 29 of said structure 25 are inserted into holes provided in the side parallel cheeks of the pusher lever 30, the cross-sectional shape of which is such as shown in Fig. 9a. The pressure thus applied on the lever eliminates any transversal play. A hook 31, integral with the hopper, insures the locking action.

In Fig. 10 the pusher lever 30 is similarly mounted on the middle portion of a wire structure 32 encircling a handle member 27 with the aid of a lock 28. The two symmetrical end portions of this structure are first curved so as to form a U-shaped stirrup 33 the parallel branches of which are adapted to be slid into vertical grooves 33a provided in the hopper. The wire is then led around the hopper, as at 34, and is finally hooked or rolled round the first branch of the stirrup, at 35. The drum is held between the lower edge 24 of the hopper and the stirrup 33. It may be taken away by simply lifting the hopper, which may itself be completely removed from the wire structure.

As previously stated, the graters shown in Figs. 11 and 12 are used with drums having a single lateral stop means, such as the type shown in Fig. 3.

The hopper is provided with two downwardly projecting extensions 36 comprising outwardly projecting bearing sleeves or skirts 37 adapted to support the drum. The latter is slid into these sleeves until its flange 3 abuts against the front one, as shown in Fig. 12. A swivelling hook 38 locks the drum in position.

The handle and the stem of the pusher device of the grater shown in Fig. 11 are similar to those previously described.

On the contrary, in the case of the grater shown in Fig. 12 the handle and the stem of the carrying structure constitute an integral member comprising two spring wires 39 which are coiled at 40, safety pin-like, braced by a transverse link 42 and terminated by spring hooks 41. The latter may removably receive two side lugs 43a provided on an arched sheet metal pusher plate 43. The spacing of the upper branches of the structure is slightly greater than the width of the hopper, and the side walls of the hopper are provided with notches 44 serving to guide the lugs 42.

This embodiment has the advantage that the pusher device is normally maintained in the raised position. This feature may be used with any of the previously described embodiments in which the handle is independent from the drum suspending means.

All the embodiments hereinbefore described may be provided with resting means comprising any suitable number of resting elements arranged in such a manner that they permit of bringing the grater to rest upon a table or a receptacle.

I claim:

1. A kitchen grater comprising a feeder receptacle having an open top and bottom; a rotary cylindrical grater drum; a crank arm for rotating said drum, said crank arm being secured directly to said drum; circumferential support means rotatably suspending said rotary cylindrical grater drum along said open bottom of said feeder receptacle, said support means being secured to said feeder receptacle and including a portion swingable relative to said drum so as to permit moving of said drum into and out of position; and means for locking said support means in drum engaging position, and two projecting stop means each arranged at one end of said rotary cylindrical grater drum and engaging the opposite edges of said support means when the same is in drum engaging position thereby preventing sliding of said drum in axial direction.

2. A kitchen grater comprising a feeder receptacle having an open top and bottom; a rotary cylindrical grater drum; a crank arm for rotating said drum, said crank arm being secured directly to said drum; circumferential support means rotatably suspending said rotary cylindrical grater drum along said open bottom of said feeder receptacle, said support means being secured to the exterior of said feeder receptacle and extending below its bottom plane and including a portion swingable relative to said drum so as to permit moving of said drum into and out of a position subjacent said receptacle; means for locking said support means in drum engaging position, and two projecting stop means each arranged at one end of said rotary cylindrical grater drum and engaging the opposite edges of said support means when the same is in drum engaging position thereby preventing sliding of said drum in axial direction.

3. A kitchen grater comprising a feeder receptacle having an open top and bottom; a rotary cylindrical grater drum; a crank arm for rotating said drum, said crank arm being secured directly to said drum; circumferential support means for said drum embracing the same in relatively spaced vertical planes, said support means being secured to said feeder receptacle and including a portion swingable relative to said drum so as to permit moving of said drum into and out of position; means for locking said support means in drum engaging position, and two projecting stop means each arranged at one end of said rotary cylindrical grater drum and engaging the opposite edges of said support means when the same is in drum engaging position thereby preventing sliding of said drum in axial direction.

4. A kitchen grater comprising a feeder receptacle having an open top and bottom; a rotary cylindrical grater drum; a crank arm for rotating said drum, said crank arm being secured directly to said drum; a wire-like structure swingably secured to said feeder receptacle and extending below its bottom plane, said wire-like structure substantially encircling the exterior of said drum and thus suspending the same below said feeder receptacle when swung into position and permitting withdrawal of said drum when swung out of position; and means for locking said wire-like structure in drum engaging position.

5. A kitchen grater comprising a feeder receptacle having an open top and bottom; a rotary cylindrical grater drum; a crank arm for rotating said drum, said crank arm being secured directly to said drum; a wire-like structure secured to said feeder receptacle and including relatively movable complementary portions substantially encircling the exterior of said drum so as to suspend the same below said feeder receptacle when said complementary portions are moved together and permitting the withdrawal of said drum when said portions are moved apart; and means for locking said portions in drum engaging position.

6. A kitchen grater comprising a feeder receptacle having an open top and bottom; a rotary cylindrical grater drum; a crank arm for rotating said drum, said crank arm being secured directly to said drum; a wire-like structure having a main body and a lateral extension and being swingably secured to said feeder receptacle so as to extend with its main body below the bottom plane of said receptacle, said main body substantially encircling the exterior of said drum and thus suspending the same below said feeder receptacle when swung into position and permitting withdrawal of said drum when swung out of position; means for locking said wire-like structure in its drum engaging position; and a pressure arm for forcing the material to be grated against said drum, said pressure arm being pivoted to said lateral extension of said wire-like structure.

7. A kitchen grater constructed in accordance with claim 6, including a handle supported by said lateral extension of said wire-like structure.

JEAN MANTELET.

REFERENCES CITED

The following references are of record in the file of this patent:

UNITED STATES PATENTS

| Number | Name | Date |
|---|---|---|
| 378,127 | Baltzley | Feb. 21, 1888 |
| 508,784 | Jenckes | Sept. 12, 1893 |
| 1,129,223 | Payne | Feb. 23, 1915 |
| 1,171,747 | Newhouse | Feb. 15, 1916 |
| 2,271,175 | Mantelet | Jan. 27, 1942 |
| 2,360,804 | Swint | Oct. 17, 1944 |

FOREIGN PATENTS

| Number | Country | Date |
|---|---|---|
| 460 | Great Britain | Jan. 10, 1890 |